July 24, 1962  T. V. ELSETH  3,046,438
APPARATUS FOR ELECTRIC ARC WELDING
Filed Sept. 1, 1959
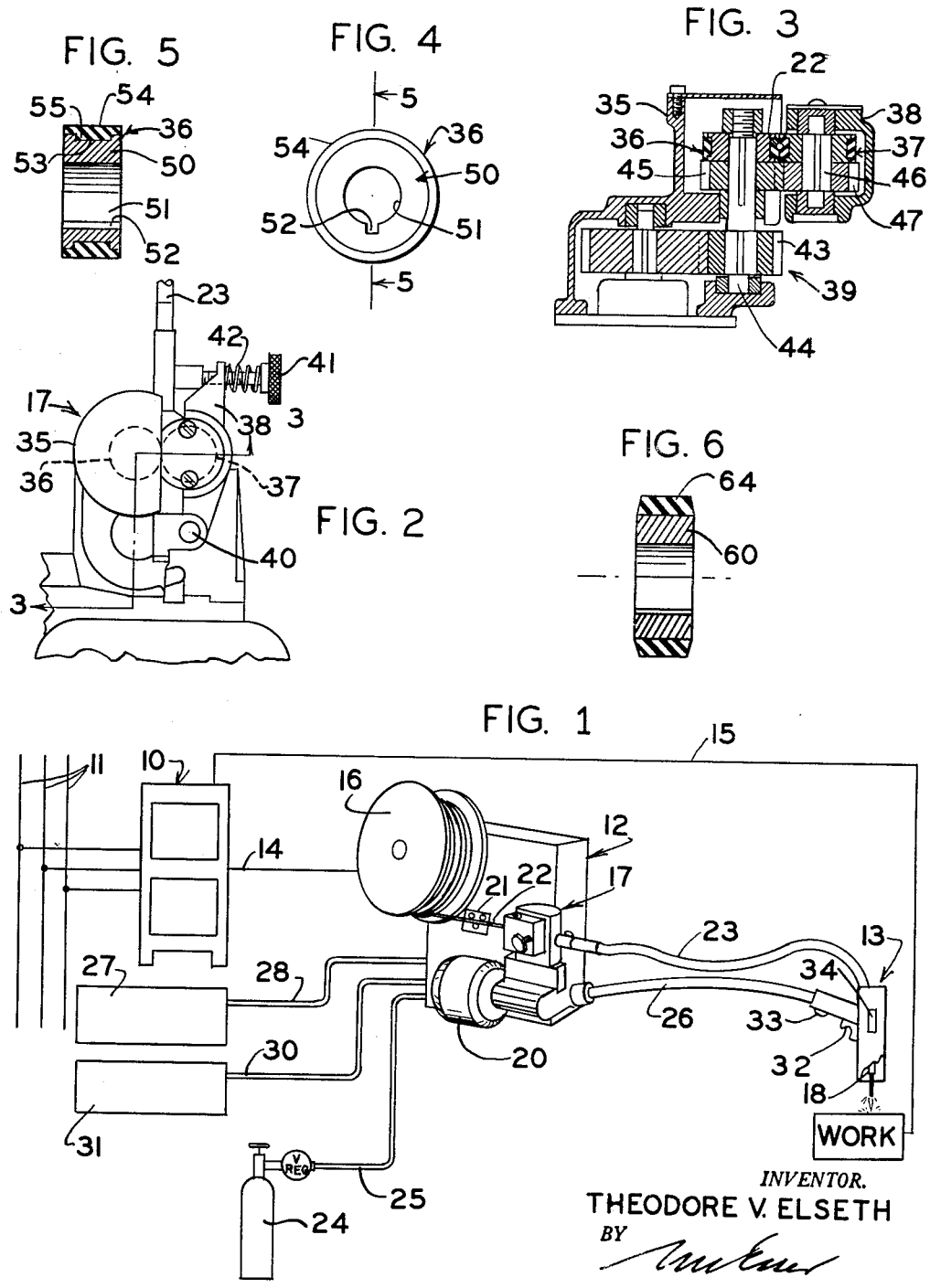
INVENTOR.
THEODORE V. ELSETH
BY
Attorney United States Patent Office 3,046,438
Patented July 24, 1962

3,046,438
APPARATUS FOR ELECTRIC ARC WELDING
Theodore V. Elseth, Orland Park Hills, Ill., assignor to Chemetron Corporation, Chicago, Ill., a corporation of Delaware
Filed Sept. 1, 1959, Ser. No. 837,425
2 Claims. (Cl. 314—69)

The present invention relates to apparatus for electric arc welding and more particularly to a device which includes structure for positively driving welding electrode wire which protects the electrode wire from damage as it is being driven thus tending to ensure a uniform arc characteristic at the welding zone.

Wire drive units for transferring welding electrode wire from a wire reel to the welding head conventionally include rotating metal feed rolls through which the wire passes to drive the wire. One form of feed roll commonly used is of steel which is knurled on its wire engaging surface to provide sufficient friction to drive the wire. However, this arrangement presents a problem when the welding electrode wire being utilized is relatively soft as compared to the feed rolls, as, for example, when the wire used is either aluminum or cooper. In this situation the hard steel knurled feed rolls knurl the relatively soft wire as it passes through the rolls, thus deforming and damaging the wire. When this damaged wire reaches the welding zone, the change in the wire characteristics due to knurling causes an unstable welding arc, adversely affecting the quality of the weld.

It is, therefore, a primary object of the present invention to provide a wire drive structure for use with relatively soft welding electrode wire such as aluminum and copper which will positively drive while protecting the wire from damage as it is being driven.

Another object of the present invention is to provide a wire drive device suitable for relatively soft wire such as aluminum and copper which will positively drive the wire under normal conditions but which will disengage from the wire terminating drive in the event the wire is abnormally restrained due to a jammed condition.

A further object of the present invention is to provide a simple low-cost wire drive structure adapted for use with relatively soft welding wire such as aluminum and copper, which is easy to install and automatically effective to protect the wire during drive, and which will automatically disengage from the driving relationship when the wire is abnormally restrained downstream of the drive device.

Briefly stated, in accord with the illustrated embodiments of the invention, I provide a novel wire feed roll structure particularly adapted for use with relatively soft welding wires such as aluminum or copper. The structure includes a rigid core suitable for mounting on a drive shaft. The wire engaging portion of the feed roll consists of a rim of resilient material which is soft in relation to welding wire such as aluminum wire. In a preferred form this rim is of rubber suitably mounted on the outer peripheral wall of the feed roll core. When the feed roll is placed in operative engagement with the welding wire, sufficient friction is generated between the rotating rubber surface of the feed roll rim and the welding wire to positively drive the welding wire. As the wire engaging feed roll rim is relatively soft as compared to the welding wire, the wire will be substantially protected from damage as it passes through the feed rolls. In the event that the wire is abnormally restrained downstream of the drive unit due to kinks or other obstructions, the novel feed roll rims will slip, automatically terminating the driving relationship and forward movement of the wire. Thus build up or tangling of wire downstream of the drive unit is prevented. When the restraint is removed the normal wire drive will resume.

The invention, both as to its organization and method of operation, together with further objects and advantages thereof will best be understood by reference to the following specification taken in connection with the accompanying drawings in which:

FIG. 1 is a diagrammatic view of welding apparatus embodying the present invention;

FIG. 2 is a plan view of the wire drive unit portion of the apparatus of FIG. 1;

FIG. 3 is an elevational sectional view taken along the line 3—3 of FIG. 2;

FIG. 4 is an elevational view of one of the feed rolls of FIG. 3;

FIG. 5 is a vertical sectional view taken along the line 5—5 of FIG. 4; and

FIG. 6 is an elevational sectional view of a modified form of feed roll structure.

Referring now to the drawing and particularly to FIG. 1, there is shown therein an arc welding apparatus arrangement embodying the present invention. The exemplary illustrated arrangement includes a conventional welder 10 which may be connected to a suitable power supply 11. The illustrated apparatus also includes a control unit 12 and a welding head 13 which may advantageously be of the hand gun type. The welder 10 is connected to deliver current through a cable 14 connected to the control unit 12, and a cable 15 connected to the work. A source of welding electrode wire consisting of a wire spool 16 may be suitably mounted on the control unit 12 by means of a conventional wire reel hub, not shown. Also mounted on the control unit 12 is a wire drive unit 17 which includes gears driven by a gear motor 20. The illustrated arrangement may also include a conventional wire straightening device 21 mounted between the spool 16 and the wire drive unit 17. The welding wire 22 which may be aluminum, is fed from the wire spool 16, through the wire drive unit 17 and into the welding head 13 through a suitable flexible conduit 23 which may advantageously include connectors for plugging into the wire drive unit 17 and into the rear of the gun 13. The wire is then fed through a cylindrical copper guide tube 18 within the gun to the weld. The guide tube supports the wire mechanically and conducts the welding current to it. If the wire reaches the guide tube in a deformed or damaged condition, the electrical contact between the wire and the guide tube will be erratic, resulting in an unstable arc adversely affecting the quality of the weld. The illustrated arrangement may also include structure for delivering a shielding gas to the welding zone, and means for cooling the gun consisting of a water line passing through the gun. Shielding gas from a cylinder 24 may be carried through a conduit 25 into the control unit 12 and through a flexible hose and cable assembly 26 to the welding head 13. Water may be circulated to the gun from a water supply 27, through a suitable conduit 28, to the control unit 12, and through the flexible hose and cable assembly 26 to the gun 13. After cooling the gun, the water returns through flexible hose and cable assembly 26, control unit 12, and through a conduit 30 to a suitable water discharge 31.

The illustrated welding apparatus arrangement may also include suitable controls such as a weld "start-stop" trigger 32, a wire "inching" button 33, and a "wire feed speed" control dial 34, all mounted on the gun or welding head 13.

Referring now to FIG. 2, the wire drive mechanism 17 may include a suitable housing 35 substantially enclosing a fixed position wire feed roll 36 (see FIG. 3) described in detail below, and a feed roll 37 (see FIG. 3) mounted on a movable hinged pressure arm 38. The pressure arm 38 is pivoted about a hinge pin 40 mounted on the wire drive unit 17 and thus provides means to adjust the spacing between the axes of rotation of feed rolls 36 and 37. Pressure on the feed rolls is adjusted by means of an adjustment screw 41 which passes through a suitable borehole in hinged pressure arm 38 into a tapped hole in the housing 35. A suitable coil spring 42 is mounted on screw 41 and interposed between the head of screw 41 and the free end of hinged pressure arm 38. Wire drive mechanism 17 may also advantageously include suitable wire guides (not shown) leading into, and from, the feed rolls 36 and 37.

Referring now to FIG. 3, the wire drive mechanism 17 includes a conventional gear train 39 operatively connected to the motor 20 (not shown) to drive the feed rolls 36 and 37. The gear train 39 includes a driven gear 43 carried on a shaft 44, which also carries a gear 45 and feed roll 36. Feed roll 37 is carried on a shaft 46 suitably mounted on pressure arm 38. The feed rolls 36 and 37 are mounted in alignment with their peripheral walls in side-by-side relationship as shown in FIG. 4. The shaft 46 also carries a gear 47 which is in mesh with gear 45 on shaft 44 during the wire drive operation.

The feed rolls 36 and 37 are identical in construction and, therefore, only the structure of feed roll 36 will be described for reasons of brevity. The feed roll 36 includes a wheel-like core 50 which advantageously may be of metal such as steel. The core 50 includes a borehole 51 to receive the shaft 44 and a key-way 52 to secure the wire feed roll 36 to the shaft. The core 50 includes a groove 53 in its peripheral wall. Mounted on the peripheral wall of the feed roll 36 is a relatively thick rim or tire 54 of rubber. The rubber rim 54 may advantageously be applied to the core 50 by means of a molding operation. The rim 54 on its inner peripheral wall includes a tongue 55 suitably sized to be received within the groove 53. The core groove 53 and the rim tongue 55 cooperate to secure the rim 54 to the core 50 and prevent relative movement between the rim and the core. In determining the specifications of the rubber used in the rim 54 it is important that the rubber hardness be such that the wire may be driven under normal conditions but that slippage occur between the rim and the wire in the event that the wire encounters an obstruction downstream of the wire drive mechanism. This may occur when the wire is kinked. Through considerable experimentation it has been determined that rubber in the durometer major hardness range 50 to 80 may yield satisfactory results under certain conditions. However, rubber in the durometer major hardness range 60 to 70 is preferred where wire of approximately 1/16 inch diameter is used in conjunction with feed rolls approximately 1 1/8 inch in diameter, having a rubber rim approximately 1/8 inch thick.

Describing now the operation of the preesnt invention, when an operator wishes to weld with a relatively soft welding wire, for example, aluminum or copper, he mounts the pair of rubber-rimmed feed rolls 36 and 37 on the feed roll shafts 45 and 46. He then threads the wire between the feed rolls and applies the proper pressure to the wire by means of the adjustment screw 41. This is determined by increasing the pressure on the rolls until the wire will be driven on rotation of the rolls. The pressure may be further adjusted by restraining the wire downstream of the drive mechanism while driving the wire through the wire drive mechanism. The pressure is then adjusted until the rolls slip when the wire is abnormally restrained downstream of the wire drive mechanism. When the desired adjustment is obtained, it will be seen that the welding wire will be completely enclosed by the rubber material in the rims of feed rolls 36 and 37 as shown in FIG. 3. As a result the wire will be positively protected against deformation, nicks, damage, knurls, etc. while passing through the drive mechanism. It will thus be seen that the present invention ensures that the surface of the welding wire will be completely smooth when the wire reaches the wire guide tube, resulting in optimum continuous electrical contact, a stable arc, and a uniform weld.

Referring now to FIG. 6 there is shown therein a modified form of feed roll construction which has proven successful in which a compressible rim 64 of a resilient molded hydrocarbon material such as rubber is mounted to the outer peripheral wall of a feed roll core 60 by bonding the rim 64 to the steel core without the use of a tongue and groove joint.

While there has been described what is at present considered to be the preferred embodiments of the invention, it will be understood that various modifications may be made therein, and it is intended to cover in the appended claims all such modifications as fall within the scope of the invention.

I claim:

1. In electric arc welding apparatus, a welding electrode, a welding head, an electrode drive unit including a pair of rotatable feed rolls mounted in parallel alignment on opposite sides of a portion of said electrode to propel said electrode through said head to a welding zone, said feed rolls respectively having compressible resilient outer rims, said rims being relatively thin as compared to the diameter of said feed rolls and of rubber, mounting means comprising a hinged pressure arm for at least one of said feed rolls arranged so that the axis of rotation of the feed roll associated with it is pivotally movable relative to the axis of rotation of the other feed roll to obtain a desired relative spacing between their respective axes of rotation, resilient biasing means comprising a spring urging the feed roll mounted on the pressure arm to pivot toward the other feed roll and into operative engagement with said electrode, means for selectively adjusting the pressure of the feed rolls on the electrode including a single adjustment screw arranged to compress said spring thereby to provide a resilient frictional electrode coupling means adapted to drive the electrode under normal conditions and to automatically disengage from driving relationship therewith when the electrode is abnormally restrained downstream of the feed rolls, portions of the rims of the feed rolls on either side of the electrode substantially enclosing the electrode so that it is protected against damage as it traverses the drive unit, and means for rotatably driving at least one of said feed rolls, said driving means including a motor and control means for said motor.

2. In electrical arc welding apparatus, as claimed in claim 1, in which said rubber feed roll rims have a durometer major hardness in the range 50 to 80.

References Cited in the file of this patent

UNITED STATES PATENTS 2,272,158    Anderson _____ Feb. 3, 1942